US008571185B1

(12) United States Patent
Loizeaux (10) Patent No.: US 8,571,185 B1
(45) Date of Patent: Oct. 29, 2013

(54) MULTI-SITE PERSONAL EMERGENCY TELEPHONE SYSTEM AND METHOD

(76) Inventor: Marion Alice Loizeaux, Greenwich, CT (US)

( * ) Notice: Subject to any disclaimer, the term of this patent is extended or adjusted under 35 U.S.C. 154(b) by 367 days.

(21) Appl. No.: 12/953,400

(22) Filed: Nov. 23, 2010

Related U.S. Application Data

(63) Continuation-in-part of application No. 11/344,759, filed on Feb. 1, 2006, now Pat. No. 7,864,927.

(60) Provisional application No. 60/649,011, filed on Feb. 1, 2005.

(51) Int. Cl.
*H04M 11/04* (2006.01)

(52) U.S. Cl.
USPC .......................................... 379/45; 370/352

(58) Field of Classification Search
USPC .......... 379/37–52, 90.03, 104, 105, 106, 107, 379/110, 90.01, 90.02; 455/462, 411
See application file for complete search history.

(56) References Cited

U.S. PATENT DOCUMENTS

| | | | | |
|---|---|---|---|---|
| 4,736,404 A * | 4/1988 | Anglikowski et al. | ........ | 455/411 |
| 5,305,370 A | 4/1994 | Kearns et al. | | |
| 5,539,803 A * | 7/1996 | Bhat et al. | ...................... | 455/423 |
| 5,673,304 A * | 9/1997 | Connor et al. | ................... | 379/45 |
| 5,890,069 A * | 3/1999 | Evans et al. | .................... | 455/462 |
| 6,038,440 A * | 3/2000 | Wu | ................ | 455/410 |
| 6,518,889 B2 | 2/2003 | Schlager et al. | | |
| 7,130,384 B2 * | 10/2006 | Goldman et al. | ............... | 379/37 |
| 2002/0127994 A1 | 9/2002 | Stanners | | |
| 2004/0224701 A1 * | 11/2004 | Lewis-Evans et al. | ..... | 455/456.2 |
| 2005/0059443 A1 * | 3/2005 | Pan et al. | .................... | 455/575.4 |
| 2005/0259641 A1 * | 11/2005 | Beninato et al. | .............. | 370/354 |

* cited by examiner

*Primary Examiner* — Maria El-Zoobi
(74) *Attorney, Agent, or Firm* — LaMorte & Associates P.C.

(57) ABSTRACT

A system and method of calling for emergency services within a defined operational area. The operational area contains multiple landline telephone connection jacks that connect to multiple landlines. A mobile unit is provided that transmits and receives wireless signals. Base units are provided that receive the wireless signal transmitted by the mobile unit. Each base unit is capable of being activated by an authorized signal which may be in the transmitted wireless signal. Each base unit automatically dials an emergency number when activated. The base units are connected to at least some of the telephone connection jacks. The predetermined range of each of the base units combine to define the operational area of the mobile unit. Authorization data is exchanged between the mobile unit and each of the base units. Accordingly, the base units can identify whether or not the wireless signals transmitted by mobile unit contain the proper authorized signal.

20 Claims, 4 Drawing Sheets

MULTI-SITE PERSONAL EMERGENCY TELEPHONE SYSTEM AND METHOD

Related Applications

This application is a continuation-in-part of U.S. patent application Ser. No. 11/344,759 Feb. 1, 2006 now U.S. Pat. No. 7,864,927, which claimed the benefit of U.S. Provisional Patent Application No. 60/649,011, filed Feb. 1, 2005.

BACKGROUND OF THE INVENTION

1. Field of the Invention

In general, the present invention relates to emergency transmitter systems that automatically dial an emergency number when activated. More particularly, the present invention relates to systems and methods that use a remote wireless transceiver to communicate with a landline telephone connection.

2. Prior Art Description

There is currently a severe gap in the emergency response infrastructures, worldwide. This critical gap is the physical distance between a victim experiencing an emergency (either a criminal, fire or medical emergency), and a landline telephone to summon aid. Calling via landline telephone is the fastest way for a victim to get the help they need. This is because landline emergency calls are automatically routed directly to the caller's local PSAP (Public Safety Answering Point), and the PSAP is the entity which dispatches the appropriate emergency help: either police, fire, or medical personnel and equipment, or a combination thereof. The fastest possible response time is very important, because in emergencies, minutes and seconds can mean the difference between life and death.

The very nature of a criminal, fire or medical emergency can be what prevents a victim from reaching a phone, and thus from reaching the desperately needed help in time. Such may be the case, for example, when there is domestic violence, when there is an intruder or assailant, when there is a fire, a heart attack, a TIA, stroke, a diabetic shock, a severe asthma attack or a severe allergic reaction, a fall, a severe injury, badly interacting medications, or an overdose. In certain circumstances, a victim may only have brief seconds between the realization that they are in very serious trouble and unconsciousness, which easily may not be enough time to reach a phone, or else they may quickly become too mentally or physically impaired to reach a phone. Also, an intruder, or violent individual, may prohibit a victim from reaching a phone. The very nature of a victim's emergency can be what prevents them from having the freedom, mobility, ability, or time necessary to reach a phone.

Technology has enhanced, and speeded access to, the public health and public safety systems in amazing ways. Yet it is obvious that all these technological and infrastructure improvements are for naught if a victim cannot reach a phone to summon help. Here are some of these public health and public safety improvements:

First, there are nationally enacted, simple, memorable, national 3-digit emergency phone numbers to dial to summon help from any phone, nationwide. For example, there's 9-1-1 in North America and 1-1-2 in Europe.

Second, these national emergency phone number calls are answered by local PSAP's, or Public Safety Answering Points, which have specially trained call takers to handle the emergency call, to give instructions to the caller and to dispatch the appropriate local emergency responders and emergency equipment to the emergency.

Third, there's the ubiquitous and extremely reliable nationwide landline telephone network.

Fourth, there's the nationwide system, called Landline Enhanced 9-1-1 in the USA, for incoming landline phone calls, which instantly and automatically gives the PSAP the exact address of the phone making the call, with on-site directions, such as "Apartment E, $2^{nd}$ floor, $3^{rd}$ door on the left". This is vital to speed dispatch when a victim is unable to provide this information, i.e. due to lack of knowledge, blacking out, choking, an intruder, etc. Landline Enhanced 9-1-1 also instantly provides the name of the person to whom the phone number is issued, and the callers' phone number. Having the phone number is important when a callback is needed due to disconnection, or for further direction giving or information gathering.

Fifth, there are special radio networks connecting the PSAP's with the emergency responders.

Sixth, these emergency responders have police cars, and fire and ambulance services standing by.

Seventh, the police are specially trained in handling emergencies, and they have a plethora of skills, from subduing violent individuals, to negotiation skills in domestic abuse and hostage situations, to handling medical emergencies. They also have several levels of weaponry to deal with violent individuals, from batons and stun guns, to guns. They have tools for medical aid which can range from first aid and CPR knowledge, to portable oxygen units and defibrillators.

Eighth, firemen have extensive training and trucks with ladders, pumps, water, and chemical fire suppressants.

Ninth, ambulances are mini mobile emergency rooms, which can use triage and begin life-saving efforts immediately, and which can radio ahead to alert a hospital to the needs of the incoming victim. At the hospital, there are dramatic advances in knowledge, drugs, imaging technology and surgery. There are also med-evac helicopters, hospitals with helicopter landing pads, and hospitals with areas of specialization, such as burn units or open heart surgery.

This entire infrastructure, however, is for naught if A) the victim cannot reach a phone to summon help, or B) the means of summoning help causes delays that prevent the needed help from arriving in time. Time is obviously critical when an individual has impaired or stopped breathing, or when his heartbeat is intermittent or stopped.

This present invention is A) tiny enough to be worn continually, so it's always available and within reach of the user, and B) the fastest way to contact the local PSAP dispatchers.

Existing portable technologies are far inferior to the present invention for summoning emergency help. Devices for making telephone calls to emergency responders in emergency situations fall into five broad categories:

(1) devices that are solely fixed to a landline phone jack wall outlet;

(2) devices that are fixed to a landline phone jack wall outlet and have a portable cordless handset such as that disclosed in U.S. Pat. No. 5,305,370;

(3) devices that are fixed to a landline phone jack wall outlet and have a portable cordless medallion such as that disclosed in U.S. Pat. No. 5,673,304;

(4) devices that are mobile and utilize cellular phone technology such as that disclosed in U.S. Pat. Appl. Pub. No. US 2002/0127994 A1; and (5) devices that are mobile and utilize satellite phone technology such as that disclosed in U.S. Pat. No. 6,518,889.

There are problems and limitations with all of these devices. Devices fixed to a landline phone jack wall outlet require the caller to travel to the fixed location of the device to initiate the emergency call. Thus, a significant delay is incurred in a situation where speed is essential, critical, and possibly life-saving. Also, the caller is required to leave the site of the emergency. Thus, the caller is unable to render needed assistance at the site of the emergency. Also, if the victim is alone, he or she may be unable to travel to the fixed location of the device due to the emergency. This may be the case in fire emergencies, and in medical emergencies such as heart attack, stroke, and accidental injury. Also, criminal emergencies such as kidnapping, assault, robbery, and domestic abuse may involve one or more perpetrators who prevent the victim from traveling to the fixed location of the device.

Although cordless handset devices offer remote initiation of emergency phone calls, they are too bulky and cumbersome to be carried or worn on the user's person all the time. Thus, the user has no certainty of the handset being within reach at the time of the emergency. Also, a cordless handset device requires recurring recharging of its battery on its base unit, which is plugged into an electrical outlet. This is required at varying intervals of time depending on usage. Thus, it is uncertain whether the cordless handset device will have an adequately charged battery to be operable at the time of the emergency. And thus, there are recurring time periods while its battery is being recharged on its base when the cordless handset is unusable by the user. Also, the cordless handset is limited to initiating telephone calls via its own base. Thus, the usefulness to the user of the cordless handset device is limited to the time period when the user is within cordless telephone range of that single base unit.

Medallion devices that communicate to a base fixed to a landline phone jack wall outlet, and medallion devices that are remote activators of alarm systems, do not have audio transmission capability. Thus, the user is unable to verbally communicate with the emergency responder whom they have called. Thus, the emergency responder is unable to determine the nature of the emergency. Thus, the emergency responder is unable to select and dispatch the appropriate help for the emergency, whether fire, police or ambulance. Although some bases have speakerphone capability, and some secondary speakerphones may be installed at the users location, unless the emergency victim is near one of these speakerphones they will still be unable to communicate with the emergency responder. Due to this lack of audio communication capability, medallion devices must call a pre-programmed number for a commercial central monitoring station (CCMS), rather than the local 911. Upon receipt of a call from a customer, the CCMS then calls a pre-determined list of friends and/or relatives and/or neighbors to dispatch them to the caller to determine if there is an emergency, and if so, to determine the nature of the emergency. Thus, a significant delay is incurred in a situation where speed is essential, critical, and possibly life-saving. If the CCMS is unable to reach a person on that pre-determined telephone list, then the CCMS must call the local police, or the local public safety answering point (PSAP). The PSAP is the local dispatcher of emergency vehicles, or the local call screener and relayer of emergency calls to the dispatcher of one or more of the local emergency services of fire, police and ambulance. The CCMS may be located in another state or across the country. Thus, this call from the CCMS to the police or PSAP cannot be made with the national emergency telephone number, such as 911 in the U.S., because calling 911 would reach the PSAP in the CCMS's local community, not the PSAP in the emergency victim's community. The call to the police or PSAP must be made on an administrative, non-priority telephone number. Thus, there may be a significant delay while the CCMS tries to determine which is the correct police or PSAP jurisdiction that dispatches to the victim's location. There may then be another delay while the CCMS determines what is the proper administrative telephone number for that police station or PSAP. With the rapid increase in new telephone exchanges and area codes, and with PSAPs that change location or obtain new equipment, databases of administrative numbers for PSAPs may become obsolete. Also, due to geographic features, irregular community borders, and irregular jurisdictions, the administrative telephone number selected may not be the nearest, or the jurisdictionally responsible, police station or PSAP. Thus, further delays may be incurred as the called police station or PSAP determines the exact location of the emergency, determines which is the appropriate responder, and attempts to forward the call or relays the information to the CCMS, who then determines the new administrative number and calls it. Also, calls coming in on administrative numbers do not come in to the dedicated emergency responder's call station console. Thus, they cannot be easily transferred to another jurisdiction, which causes further delay. Also, unlike 911, administrative telephone numbers are not priority numbers. Thus, these calls are not answered with the same urgency or priority as an emergency call; and if the call is made after-hours, or if the police or PSAP are under-staffed or busy, a call coming in on an administrative number may not be answered at all. Also, calls that come in on administrative numbers do not link with the ubiquitous Landline Enhanced 911 system, as 911 calls do. Landline Enhanced 911 provides ANI (Automatic Number Identification) data that instantly displays the victim's calling number. Thus, the recipients of the transferred emergency call are unable to call back the victim if the victim's call is accidentally or maliciously disconnected, or if they require further information. Landline Enhanced 911 also provides ALI (Automatic Location Identification) data that instantly provides the victim's exact street address, and provides on-site directions which are essential when responding to multifamily dwellings and apartment houses. Thus, the recipients of the transferred emergency call do not have a display of the victim's exact street address information with on-site directions. And thus, they cannot relay the missing location information electronically to a console in a fire, police or ambulance vehicle. Also, for calls coming in on administrative numbers, significant risk of human error is introduced e.g., through dyslexic transposition of numbers, or misreading or misspeaking information. The telephone number of the victim, if available and if noted by the CCMS, along with the location of the emergency, must be communicated several times. It must be verbally communicated by the CCMS, manually transcribed by the person answering the administrative number, relayed to the dispatcher, and verbally relayed by the dispatcher to the personnel responding to the emergency. Thus, the risk of human error is introduced by the CCMS, the transcriber, the dispatcher and the responding personnel. Also, medallions must pay a substantial, recurring monitoring fee to their CCMS for service. Thus, medallions are costly and this cost can be psychologically or financially prohibitive to many individuals.

Wireless devices, which include mobile and cellular devices, are still too large for many people to carry or wear them on their person all the time. Thus, the user has no certainty of the wireless device being within reach at the time of an emergency. Also, a wireless device requires recurring recharging of its battery, by plugging it into a charger which is plugged into an electrical outlet. This is required at varying intervals of time depending on usage. Thus, it is uncertain whether the wireless device will have an adequately charged battery to function at the time of an emergency. And thus, there are recurring time periods while its battery is being recharged when the wireless device is unusable by the user. Also, the wireless device only works while it is within range of a transmission tower in its network. Also, geographic and architectural features may severely interfere with, or prohibit, transmission to a tower in its network. Thus, the usefulness to the user of a wireless device is limited to the time period when the user is within uninterfered range of a transmission tower in its network. Also, most wireless calls to 911 are routed to and answered by a state police barrack or a regional wireless emergency answering point, either of which could be a hundred miles or more away from the caller, or in a different state. Thus, the wireless emergency 911 call was routed to an entity that cannot provide direct, immediate help. Like the problem facing the CCMS, described above for medallion callers, the state police or wireless regional answering point must try to ascertain the geographically and jurisdictionally correct local PSAP to call. They must then determine the administrative telephone number for that PSAP. That number is not a priority emergency number, and may be delayed in being answered or may not be answered at all. That number may have changed due to a move or a change in area codes, exchanges or new equipment. That number will not be linked to the emergency response person's emergency call-taking console. The call will not come in with the ANI or ALI data of Landline Enhanced 911. Information such as the victim's name, the victim's phone number, the victim's location and the nature of the emergency will have to be communicated verbally to the state police or regional wireless answering point. Then the information must be recorded manually, communicated to one or more local PSAPs via administrative telephone numbers, recorded manually again each time, manually delivered to the emergency call-taker at the emergency call-taking console, read and relayed verbally to the local emergency responder, or read and relayed to a local emergency dispatcher who will record it manually again and then read and relay it verbally to a local emergency responder. Thus, each of these steps incur critical time delays and incur critical risks of errors in typing, handwriting, deciphering handwriting, reading, verbalization, pronunciation, of dyslexia and the like. Also, a wireless device presents a problem if the caller is unable to state their location, which could be the case if the call is accidentally or maliciously terminated early, if the caller loses consciousness, if the caller has a closed airway from a blockage, asthma or an allergic reaction, or if they are being prevented from speaking due to a domestic abuse situation, an intruder, or an assailant. It's also a problem when the emergency has impaired a victim's cognitive function, which can happen to victims of TIA, stroke, diabetic shock, and overdose. It's also a problem if the victim doesn't know their exact address because they are a child, or because they are just visiting a location. Current cell phone location finding technologies are based on either network based solutions, such as tower triangulation, or on handset based solutions, such as Global Positioning System—GPS, or combination network/handset based solutions, such as Assisted GPS—A-GPS. These solutions all take from 2 to 7 minutes to determine a location. Thus, they create a significant and critical delay in the dispatching of aid to the emergency location. Also, a location is currently accurately obtainable only 60% of the time. Thus, there is a 40% chance that no help will be able to be dispatched at all. Also, the above statistics of 2 to 7 minutes to determine a location and that being obtainable only 60% of the time only apply to the fraction of PSAPs that have the equipment to attempt the location of a wireless call. Thus, many PSAPs are entirely unable to locate an emergency caller who calls with a wireless device. Also, even if the PSAP does have locating equipment, the location which may ultimately be obtained (60% of the time), will not be a street address, but geographic coordinates of latitude and longitude. These will not necessarily be a location on a street, but could be somewhere between streets. There is further risk of imprecision because the computerized local geographic maps are created with many data points obtained in the field and inputted manually. Also, the geographic location of latitude and longitude does not yield a precise point, but a range. In 1996, the Federal Communications Commission adopted wireless E-911 rules, establishing a location accuracy requirement of "100 meters for 67 percent of calls and 300 meters for 95 percent of calls". Subsequent advances in handset based location technologies caused the Commission to revise its rules to accommodate these developments, and in so doing, they imposed the more stringent accuracy requirement for handset based solutions; namely, "50 meters for 67 percent of calls and 150 meters for 95 percent of calls". Thus, the required location range is 150 to 450 feet for handset based solutions, and 300 to 900 feet for network based solutions. Ranges of 150 feet to 900 feet could include many, many homes in suburban locations, or hundreds of apartments in a city. Also, there is also no z-coordinate telling which floor the call came from, another great handicap in an urban location. Thus, these are situations in which emergency location of a wireless device is impossible. In a suburban area, a typical example of a location obtained from an emergency call made by a wireless device would be "within 150 to 900 feet of a point .37 miles east-southeast of the intersection of Maple Street and Northern Avenue". An emergency call from the exact same spot made by the present invention would be "42 Aspen Street, Apartment E, $2^{nd}$ floor, 3rd door on left". In an urban area, a typical example of a location obtained from an emergency call made by a wireless device would be "within 150 to 900 feet of a point .03 miles northeast of the intersection of $81^{st}$ Street and Fifth Avenue". An emergency call from the exact same spot made by the present invention would be "582 Fifth Avenue, Apartment 15J, 15th floor, $7^{th}$ door on the left". Also, wireless devices must pay significant, recurring monitoring fees to their wireless provider for service. Thus, owning a wireless device for emergency calling purposes becomes costly over time, and this cost can be psychologically or financially prohibitive to many individuals.

Devices that are mobile and utilize satellite phone technology are too large, bulky and cumbersome to carry or wear on a user's person all the time. Thus, the user has no certainty of the satellite device being within reach at the time of an emergency. Also, a satellite device requires recurring recharging of its battery, by plugging it into a charger which is plugged into an electrical outlet. This is required at varying intervals of time depending on usage. Thus, it is uncertain whether the satellite device will have an adequately charged battery to function at the time of an emergency. And thus, there are recurring time periods while its battery is being recharged when the satellite device is unusable by the user. Also, the satellite device only works when it is able to obtain line of sight transmission and reception with the satellite. Thus, it is severely limited to operating outdoors or through a window. Also, it requires a period of time to acquire a fix on a satellite. Thus, there is a delay that is unacceptable in an emergency. Also, to obtain the callers location requires that a theoretical minimum of three satellite fixes be acquired. In actual practice, five or six satellite fixes are usually necessary. Each satellite acquisition takes additional time. Thus, satellite location causes further delays which are unacceptable in an emergency. Also, satellite location is obtained through GPS which, like wireless devices, is based on latitude and longitude. Thus, it is limited by the imprecision of the computerized local geographic maps. Also, satellite devices are extremely costly and their costs per call are very high. Thus, the expense of owning a satellite device for emergency calling purposes is psychologically and financially prohibitive to most individuals.

Accordingly, it is an object of the present invention to provide an emergency calling device which can directly call the national emergency telephone number, such as 911 in the U.S., which overcomes or greatly alleviates the foregoing problems and shortcomings of prior devices.

It is a further object of the invention to provide an emergency calling device which is inexpensive to purchase, has no recurring monitoring or other fees, and can be conveniently and unobtrusively carried or worn by the user at all times.

It is a further object of the invention to provide an emergency calling device which does not require any battery recharging by the user, thus no downtime, and that has backup battery power for operation during power outages.

A further object of the invention is to provide an emergency calling device which has a wearable pod unit with a single button to provide single button emergency calling capability, and a sliding cover over the single button to protect the button from accidental activation and to enable single-handed calling operation while in the users pocket.

It is still a further object of the invention to provide an emergency calling device which has a wearable pod unit with a microphone and a speaker for 2-way audio communication, and a 3 position switch providing single-handed selection of one of 3 modes: speakerphone, phone, and monitor-only meaning mute.

It is still a further object of the invention to provide an emergency calling device which has a base unit that connects to a landline phone line to provide maximum reliability and Landline Enhanced 911 ANI and ALI capability for every emergency call.

It is still a further object of the invention to provide an emergency calling device which has a base unit that uses password protected pod unit authorization to prevent mischievous or malicious calling of the emergency number.

It is still a further object of the invention to provide an emergency calling device which has a base with password protection that can selectively unauthorize a pod unit, such as that of a former employee who may otherwise misuse their pod unit for mischievous or malicious calling.

It is still a further object of the invention to provide an emergency calling device which has a base that can authorize a multiplicity of pod units, that can store and display each authorized pod unit owner's name, and can recall and display the pod unit owner's name of each pod unit that places an emergency call via that base.

It is still a further object of the invention to provide an emergency calling device which has a pod unit that can be authorized by a multiplicity of bases, so that the user can have emergency calling capability in and around an extensive network of locations they may frequent, such as home, farm, school, dorm, work, church, homes of friends, neighbors and relatives, gym, cottage, ice rink, swim club, golf club, and soup kitchen.

It is a further object of the invention to provide an emergency calling device with a pod unit which will use a separate, replaceable, secondary battery to check to see if it is within calling range of an authorizing base unit whenever the user slides open its sliding cover; and if it is within range an audible dial tone will be heard. Meanwhile, the primary, replaceable battery is reserved solely for making emergency calls.

It is an object of the invention to provide an emergency calling device which is easily carried or worn by the user, easily set up, easily authorized, easily unauthorized, and which easily makes emergency calls.

It is an object of the methodology of the present invention to provide a user with access to the most powerful and effective emergency calling and location technology available, which is via landline telephone to a national emergency response number such as 911 linked to Landline Enhanced 911, and to provide a user with this access literally within their reach in as many locations as possible.

SUMMARY OF THE INVENTION

The present invention is a system and method of calling for emergency services within a defined operational area. The operational area contains multiple landline telephone connection jacks.

A mobile unit is provided that is capable of transmitting and receiving wireless signals. Furthermore, base units are provided that are capable of receiving the wireless signal transmitted by the mobile unit within a predetermined range. Each base unit is capable of being activated by an authorized signal which may be in the transmitted wireless signal. Each base unit automatically dials an emergency number when activated.

The base units are connected to at least some of the telephone connection jacks. The predetermined range of each of the base units combine to define the operational area of the mobile unit.

Authorization data is individually exchanged between the mobile unit and each of the base units. Accordingly, the base units can identify whether or not the wireless signals transmitted by mobile unit contain the proper authorized signal.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the present invention can be embodied in many ways, only a single exemplary embodiment is illustrated. The exemplary embodiment represents one of the best modes contemplated for the invention. However, the embodiment is merely exemplary and should not be considered a limitation when used for interpreting the disclosure or claims.

Figure 1:
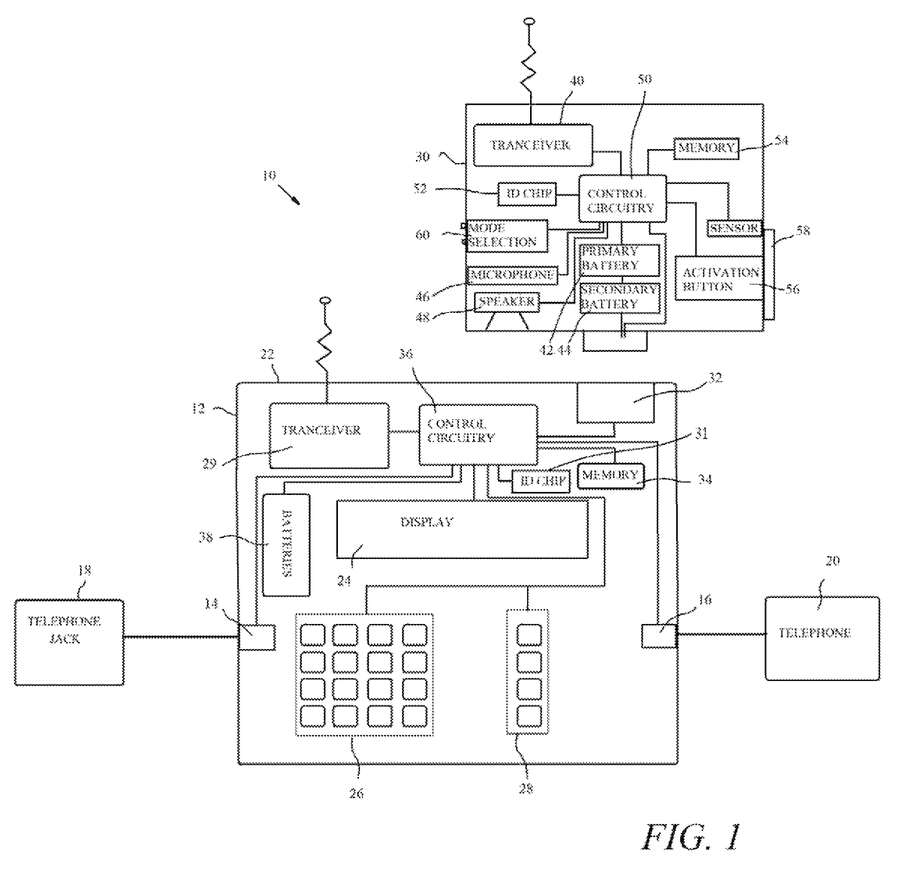
FIG. 1 is a block diagram schematic of base unit and a pod unit used by the present invention system.

Referring to FIG. 1, a schematic of a communication system 10 is shown in accordance with the present invention. The system 10 includes a base unit 12. The base unit 12 includes an input telephone cable connector 14 and an output telephone cable connector 16. The input telephone cable connector 14 is used to connect the base unit 12 to a landline telephone wall jack 18. The output telephone connector 16 is used to connect the base unit 12 to a standard landline telephone 20. It will therefore be understood that the base unit 12 can be installed at any location where a landline telephone 20 is or is not connected to a telephone wall jack 18.

When not activated, the base unit 12 connects the landline telephone 20 to the telephone wall jack 18. In this manner, the landline telephone 20 operates in the same manner as if the base unit 12 were not present.

The base unit 12 includes a housing 22 that is preferably self-supporting on a flat surface. The base unit 12 has a display 24 and a user input interface 26 for viewing and entering alphanumeric data. The base unit 12 also has a variety of function keys 28, the purpose of which is later explained.

Within the base unit 12 is a radio signal transceiver 29 that enables the base unit 12 to communicate wirelessly with a remote pod unit 30. The base unit 12 also preferably contains a connection receptacle 32 with internal electrical circuitry that enables the base unit 12 to engage the pod unit 30 and directly exchange data with the pod unit 30.

Within the base unit 12 are also a memory 34, control circuitry 36 and optional backup power batteries 38.

The pod unit 30 includes a transceiver 40 for communicating with the transceiver 29 in the base unit 12. The pod unit 30 is battery powered and may contain both a primary battery source 42 and a secondary battery source 44.

The pod unit 30 contains a microphone 46 and speaker 48 so that audible signals can be processed for transmission and reception. Within the pod unit 30 are also control circuitry 50, and ID chip 52 and a memory 54. The activation of the pod unit 30 is controlled by a large activation button 56. The activation button 56 may be protected by some type of protective slide covering 58 that prevents the activation button 56 from being inadvertently pressed. Mode selection controls 60 are also provided for a purpose that is later explained.

Figure 2:
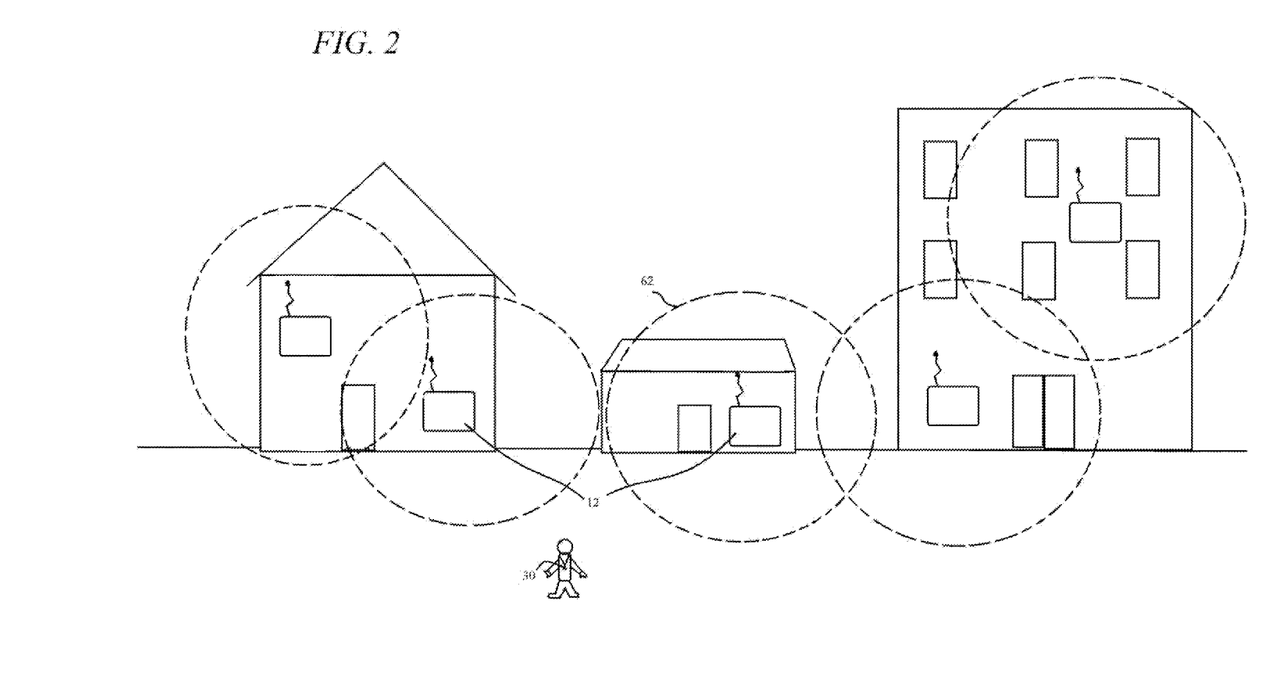
FIG. 2 is a schematic showing an operational area defined by a plurality of base units.

Referring to FIG. 2 in conjunction with FIG. 1, it can be seen that base units 12 can be added to telephone wall jacks 18 in multiple locations. Those locations can be within the same building or among a variety of buildings to create a customized coverage area 62. The coverage area 62 for a particular individual would preferably cover the areas most commonly traveled by that individual, such as their home, garage, work office and the like.

Although multiple base units 12 define the coverage area 62, the multiple base units 12 respond to the same pod unit 30. Accordingly, as long as a person with a pod unit 30 remains in his/her coverage area, the system 10 will operate properly.

The purpose of the system 10 is for a person in distress to summon emergency help. A person carries the pod unit 30 with him/her. Once activated, the pod unit 30 communicates with the nearest base unit 12 in the coverage area 62. The base unit 12 dials a predetermined emergency telephone number and provides a radio link between the base unit 12 and the pod unit 30.

The system 10 utilizes several very robust and effective technologies: cordless telephony, the national landline telephone system, the national emergency telephone number system, and the national landline enhanced emergency number system (called Landline or Wireline E-911, in the United States). The system provides the unique ability to remotely (from ones' wrist, pocket, etc.) call direct to the local PSAP, worldwide, via landline phone line, thereby accessing the local PSAP's incoming-landline-call capability to instantly know 'the precise street address, with on-site directions', enabled by the landline enhanced emergency number system. Beyond this, the system 10 offers 2-way full-duplex voice in 'hands-free' speakerphone mode and in telephone mode, and 1-way voice in 'monitor-only' mode. As will be explained later in more detail, the system has the capabilities of seizing the telephone line from other calls in progress; and of automatically conducting a self-test, a range test, and an authorization test, whenever its protective cover 58 is slid back.

Figure 3:
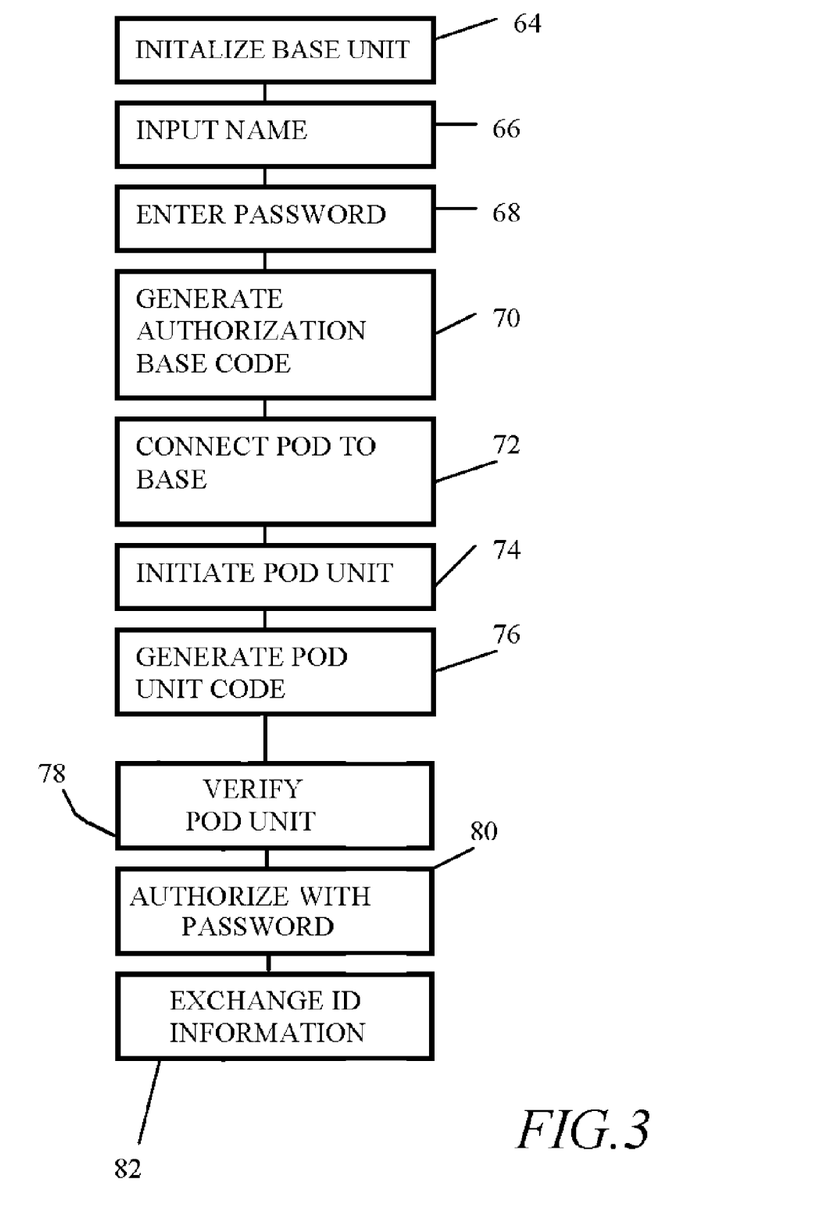
FIG. 3 is a block diagram logic flow showing a method of operation.

Referring to FIG. 3 in conjunction with both FIG. 1 and FIG. 2, it will be understood that to utilize the present invention system, the system must first be initialized for a particular user. This requires an initialization of each base unit 12 in the coverage area 62 and an initialization of the pod unit 30 being carried by a user. To initialize the base unit 12, as is indicated by Block 64, the base unit 12 is caused to display an initial prompt when its power is first turned on. The prompt requests the base owner to input their exact name, as opposed to a nickname or euphemistic name, or the exact name of their entity, for instance the name of the store where the base unit will be connected to a landline telephone jack. See Block 66.

After the base unit's name has been entered, then the base unit displays a prompt to enter a password. See Block 68. Entering a password may be optional, but should be strongly encouraged as essential in locations where the public, or malicious or mischievous individuals, could have access to the base unit 12. If a user enters a password, the base unit 12 displays a prompt requesting that the password be input a second time, to verify that it was entered as intended. Though the preferred embodiment for entering the password is with the user interface, other methods are possible, such as a telephone keypad, a point and click joystick and display, a pressure-sensitive LCD screen and the like.

Upon successful entry of the base unit name and completion of the optional password entry, a unique ID code is randomly generated, by using random number generation; or preferably, the base unit 12 already has a unique code through its license plate ID chip 31, or obtained in a manner similar to giving a serial number to a piece of software. This unique code is referred to as the "authorizing base code". It is stored in the base unit's memory 34. See Block 70

Similar to initializing the base unit 12, to initialize the pod unit 30, the pod unit 30 is placed in the receptacle 32 of any base unit 12, thereby bringing the pod unit 30 into direct electrical contact with the base unit 12. See Block 72. Alternatively, cordless telephony, radio frequencies, Bluetooth®, infrared, or other means of communication could be used for communication between the pod unit 30 and the base unit 12. When the base unit 12 detects the presence of the pod unit 30, then the base unit 12 queries the pod unit 30 to determine if it has been initialized. If the pod unit 30 is not yet initialized, the base unit 12 displays a prompt, requesting the pod unit owner to enter his or her exact name. See Block 74.

The instructions accompanying the system 10 should instruct the pod unit 30 and base unit 12 owners to enter their own exact names when they are initializing their devices, as opposed to nicknames or euphemistic names. This is because, after an emergency call is made, the name of the owner of the pod unit placing the call is displayed on the base unit. When emergency responders arrive, it could be very useful and timesaving to read the exact name of the caller on the base unit 12, as opposed to a nickname, thereby giving emergency responders a better idea of the most probable places to look for the given individual.

Upon successful entry of the pod unit owner's name, a unique code is randomly generated, by using random number generation; or preferably, the pod unit 30 already has a unique code through its license plate ID chip 52, or obtained in a manner similar to giving a serial number to a piece of software. This unique code is referred to as the "pod unit code". It is stored in the pod unit, in correlation to the pod unit owner's name. See Block 76.

Prior to use, a pod unit 30 is authorized by one or more base units 12. See Block 78. To authorize a pod unit 30 by a base unit, it is placed in the receptacle 32 of that base unit 12 to bring it into electrical contact with the base unit 12. Alternative methods are possible, using such communication technologies as cordless telephony, radio frequencies, Bluetooth®, infra red, etc.

One of the function keys 28 on the base unit 12 serves as the "Authorize Pod unit" button. If this button is pressed without a pod unit 30 on the base, a prompt to place a pod unit 30 on the base unit 12 will be displayed. If there is a pod unit 30 on the base unit 12, the pod owner's name will then be displayed on the base unit's display 24. This enables the base unit's owner to verify that the pod unit 30 he is about to authorize, is initialized by, meaning belonging to, a responsible party whom he trusts. This is to contribute further to prevention of malicious or mischievous misuse of the system 10.

Displayed on the base unit 12, along with the pod unit owner's name, will be a prompt to enter the base's password for authorization. See Block 80. After the password is entered, there is an exchange of data between the pod unit 30 and the base unit 12. The pod unit 30 sends its owner's name and pod unit code to the base unit 12, to be stored in the base's memory 34. The base unit 12 sends its authorizing base code to the pod unit 30, which the pod unit then adds to its string of authorizing base codes, (each separated by a separation sequence), and stores it in its memory 54. See Block 82.

A preferred embodiment is to not store and display the authorizing bases owners' names in the pod unit 30 along with the correlated authorizing base code. This is because, if the pod unit 30 is lost, then a prankster could determine which base units 12 have authorized that pod unit 30, and could use that pod unit 30 to place prank emergency calls via any of those base units 12. However, if it is determined that pod unit owners would like to see the list of their authorizing base units 12, they could be displayed on any base unit 12, preferably protected by the pod unit having a password created during initialization, and requiring the input of that password.

Figure 4:
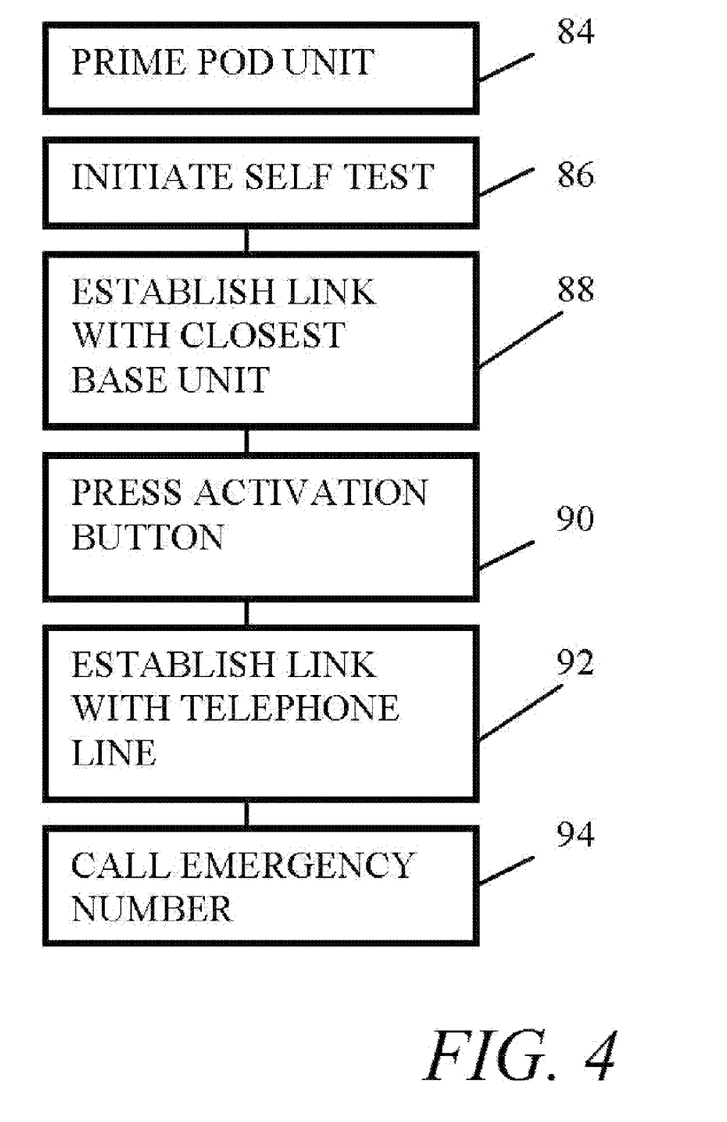
FIG. 4 is a block diagram logic flow showing a method of use.

Referring now to FIG. 4 in conjunction with FIG. 1 and FIG. 2, the use of the system 10 is explained in more detail. The pod unit user slides back the pod units' protective cover 58, which covers the activation button 56. This primes the pod unit 30 for use. See Block 84.

This protective cover 58 prevents unintentional calling of the national emergency telephone number. When the pod unit's user begins to slide back the protective cover 58, an electrical contact is made, either mechanically or by means of a Hall Effect sensor. This initiates the pod unit's system self-test, checks its batteries' capacities, and transmits its string of authorizing base's codes, with each accompanied by its own pod unit code. See Block 86 This pod unit system self-test, battery check and code transmission uses the secondary battery, unless the secondary battery is missing in which case the primary battery is used and the audible message: "Secondary battery is missing" is given.

Whenever a base unit 12 is plugged in, it will be listening for its own unique code, and will respond only when it hears its own unique code paired with one of its authorized pod unit's unique codes. Transmitting all the codes is feasible because of the very concise amount of data being transmitted and because of the speed of transmission of electronic data. The authorizing base codes are all of the same predetermined length, paired with the pod unit's code, and are separated by separator sequences, which are recognizable as separators by bases. The string of unique codes is transmitted repeatedly for a period of time until a base unit identifies its own unique code paired with the unique code of a pod unit 30 it has authorized.

When the base unit 12 recognizes this pair of codes, it responds by behaving in the same manner as a standard cordless telephone base does when communicating with its cordless telephone handset. The base then opens the landline telephone line and transmits the dial tone.

If the system is working, the batteries' capacities are adequate, and the base unit recognizes the unique sequence of its authorizing base code and one of its authorized pod units' unique codes while there is another call in progress on the landline telephone line, then a simulated dial tone is transmitted to the pod unit, and the base unit 12 continues to listen for a press of the pod units' emergency call button. See Block 88.

Opening the protective cover 58 and hearing a dial tone provides confirmation that the system 10 is working, that there is adequate battery capacity remaining, and that the pod unit is within the coverage area 62 of an authorizing base unit 12. If there is a system error or inadequate battery capacity of the primary or secondary batteries, or no authorizing base unit 12 within range, either an audible error message specifying the problem is generated by the pod unit 30 and delivered through the pod unit's speaker, or no dial tone will be heard, which will let the user know that the pod unit is not working, has low batteries, is out of range, or is unauthorized by an in-range base.

A pod unit user can always check if their pod unit is authorized by a particular base unit 12, by dropping it into the receptacle 32 on the base unit 12, and the base unit's display 24 will show either "Press the 'Authorize Pod unit' Button to Authorize", or "Authorized Pod unit, and the pod unit owner's name".

After sliding open the protective cover 58, if the system checks are successful and the battery checks are adequate, and if the pod unit is within range of an authorizing base unit 12, then a live (or simulated, if there is another call using the landline telephone line) dial tone is transmitted to the pod unit, confirming readiness of the system to place an emergency call. The pod unit user then presses the emergency call button, the power source will be switched to the primary battery; and if that primary battery runs low on power during an emergency call, the power source will be switched back to the secondary battery to extend the possible length of the call as long as possible.

When the pod units' emergency call button is pressed, it sends a signal to the base unit to dial the national emergency telephone number or another pre-selected emergency number. See Block 90. The base unit 12 will seize the telephone line from any call in progress, if necessary, as well as send a signal to any interrupt boxes plugged into extension phone outlets for the same line. See Block 92. The interrupt boxes require prior authorization in the same manner as a pod unit 30, so that the interrupt signal from the base unit 12 will only interrupt those interrupt boxes, and not ones nearby, such as in the next apartment. The pod unit 30 then proceeds to send the base unit 12 a signal, which tells the base unit 12 to dial the pre-programmed emergency telephone number.

If a pod unit's transmission is heard by two or more authorizing base units 12, then the pod unit 30 selects the strongest signal to which it can establish communications. If the activation button 56 is pressed, prior to the pod unit 30 or base unit 12 recognizing an authorized pod unit within range of an authorizing base unit, the press of the activation button 56 is stored in the pod units' memory for a period of time. This press of the activation button 56 is acted upon when an authorizing base unit 12 recognizes the authorized pod unit 30 and a live, or simulated if another call is in progress, dial tone is produced. This "emergency call waiting to be sent" is deleted after a period of time, or when the protective cover 58 is closed.

The activation button 56 beneath the protective cover 58 is preferably visually labeled with the digits of the national emergency telephone number, such as 9-1-1 in the USA. In countries that have different national emergency numbers for different services, such as in Japan, which uses 1-1-0 to call for police and 1-1-9 to call for fire and medical help, there could be two, or three, labeled emergency buttons.

When the activation button 56 is pressed, the base unit 12 dials the predetermined emergency number. See Block 94. The pod unit 30 will hear, broadcast over its speaker 48, the dial tone, the dialing sound, ringing, and then the call takers' voice, in the same order and fashion as a standard cordless telephone. The preferred embodiment is for the speakerphone mode to be the default mode. This enables hands-free operation, which can aid victims who need both hands free for dealing with their emergency. It is also helpful to the elderly or hard of hearing, and provides instant reassurance that the call is being placed. In certain circumstances, the audible emergency call may also cause a criminal perpetrator to flee, knowing that emergency help has been summoned. If it is desired to have a call pod unit usable by the deaf, one or more lights on the call pod could correspond to the audible dial tone signaling that the system checks are successful and the battery checks are adequate, and if the pod unit is within range of an authorizing base unit 12. Such lights could also signal when an emergency call had been placed, when a connection had been made, and whether it was in 2-way voice speakerphone, phone or 1-way voice 'monitor only' mode.

If it is desired to have the pod unit 30 in telephone or 'monitor only' mode, the appropriate mode selection control 60 can be switched to a new mode prior to opening the protective cover 58, or during the course of a call.

The base unit 12 may also have the capability to be user programmed to call other emergency numbers of varying lengths, and it can incorporate the telephony capabilities of other countries, to enable its use in countries with different emergency telephone numbers and different telephony standards.

Under certain circumstances, for instance when an employee is terminated by their place of employment, a base unit owner may want to de-authorize a particular pod unit 30. This can be done by pressing a function key 28 designated as the "De-Authorize Pod unit" button on the base unit 12. The display 24 on the base unit 12 will then prompt the base unit 12 owner to enter their password. After entering the correct password, the display prompts the base owner to select the pod unit 30 to be de-authorized. The list of authorized pod units is displayed, and can be scrolled through to locate the desired pod unit 30. When that pod unit 30 has been selected, for instance by being the highlighted pod unit on the display, the base owner presses the "De-Authorize Pod unit" button once again to delete the selected pod unit name and its accompanying pod unit unique code.

The present invention system 10 provides 1) Wearable Fingertip access to emergency help, which is crucial since many emergencies prevent one from reaching a phone. 2) Instant, direct calling to the local 9-1-1, which saves crucial time in situations where seconds can make a life and death difference. In contrast, calls placed by cell phone to a national emergency telephone number are answered by the state police barrack or a regional wireless answering center, either of which could be a hundred miles away, or more. 3) The instant, pinpoint, street address location of the caller, because the call is being placed on a landline phone line and therefore automatically accesses the nationwide Landline Enhanced 9-1-1 location database. In contrast, a cell phone can only derive latitude and longitude coordinates to within 150 meters, which can include many businesses, homes and apartments, and even this less precise derivation is currently achievable only 60% of the time. 4) Instant, pinpoint on-site directions, such as "Apartment E-$2^{nd}$ floor, 3rd door on left", which is also automatically provided by Landline Enhanced 9-1-1. 5) 2-way voice, with 3 modes: 1) the default mode of speakerphone, 2) phone mode and 3) 'monitor only' mode. 'Monitor only' is a mode which can provide the emergency call taker with crucial information about the nature of the emergency in circumstances where it would be hazardous for a perpetrator of a crime to be alerted to the fact that a victim is placing an emergency call. This voice capability of the pod unit enables the caller to give information about the emergency, and enables the caller to be given instructions and/or reassurance.

It is understood that the broad concept of this invention could be implemented in a variety of embodiments, or with different modifications. This description of the preferred embodiment envisioned by the inventor is not intended in any way to limit the broad scope of this invention to this preferred embodiment.

What is claimed is:

1. In a jurisdiction having an enhanced 911 emergency system that identifies an incoming telephone call from a local landline using automatic location identification data, a method of calling for emergency services within a defined operational area that contains multiple landline telephone jacks that are connected to multiple telephone landlines, said method comprising the steps of:

providing a mobile unit capable of transmitting a wireless signal;

providing a plurality of base units, each of said base units being capable of receiving said wireless signal with a predetermined range, wherein each of said base units is capable of being activated by an authorized wireless signal and wherein each of said base units automatically dials said enhanced 911 emergency system and triggers a retrieval of said automatic location identification data when activated;

connecting said base units to at least some of said telephone jacks, wherein said predetermined range of each of said base units combine to create said defined operational area;

individually exchanging authorization data between said mobile unit and each of said base units, wherein each of said base units then identify said wireless signal transmitted by said mobile unit as said authorized wireless signal; and activating said mobile unit and transmitting said authorized wireless signal, wherein one of said base units closest to said mobile unit in said operational area creates a landline call by dialing said enhanced 911 emergency system and triggering retrieval of said automatic location identification data associated with said landline call by said enhanced 911 emergency system.

2. The method according to claim 1, wherein said mobile unit contains an activation button and said mobile unit transmits said wireless signal whenever said activation button is pressed.

3. The method according to claim 2, wherein said activation button is protected by a cover on said mobile unit and said mobile unit automatically initiates a readiness test when said cover is opened to provide access to said activation button.

4. The method according to claim 3, wherein said readiness test includes transmitting a test signal to said base units and determining if said mobile unit is within said operational area.

5. The method according to claim 1, wherein each said base unit creates a wireless communication signal corresponding to said landline telephone call when activated.

6. The method according to claim 5, wherein said mobile unit contains a receiver for receiving said wireless communication signal and at least one speaker for making said wireless communication signal audible.

7. The method according to claim 6, wherein said wireless communication signal is a two-way communication signal and said mobile unit contains a microphone for sending audio from said mobile unit.

8. The method according to claim 1, wherein said step of individually exchanging authorization data between said mobile unit and each of said base units includes generating a unique code for said mobile unit and each of said base units, wherein the unique code for each of said base units is stored in said mobile unit and wherein said unique code for said mobile unit is stored within each said base unit.

9. The method according to claim 8, wherein said step of individually exchanging authorization data between said mobile unit and each of said base units includes bringing said mobile unit into direct electrical contact with each of said base units.

10. A method of calling for emergency services within a defined operational area, said method comprising the steps of:
providing a mobile unit capable of transmitting a wireless signal;
providing base units capable of receiving said wireless signal throughout a predetermined range, wherein each base unit is capable of being activated by an authorized wireless signal and wherein each base unit automatically dials an emergency number when activated;
connecting said base units to a plurality of telephone lines throughout said operational area, wherein each of said telephone landlines has its own unique automatic location identification data; and
individually authorizing each base unit to identify said wireless signal transmitted by said mobile unit as said authorized wireless signal, wherein said base units then identify said wireless signal transmitted by said mobile unit as said authorized wireless signal.

11. The method according to claim 10, wherein said mobile unit contains an activation button and said mobile unit transmits said wireless signal whenever said activation button is pressed.

12. The method according to claim 11, wherein said activation button is protected by a cover on said mobile unit and said mobile unit automatically initiates a readiness test when said cover is opened to provide access to said activation button.

13. The method according to claim 12, wherein said readiness test includes transmitting a test signal to said base units and determining if said mobile unit is within said operational area.

14. The method according to claim 10, wherein each said base unit creates a telephone call when said emergency number is dialed and wherein said base unit transmits a wireless communication signal corresponding to said telephone call when activated.

15. The method according to claim 14, wherein said mobile unit contains a receiver for receiving said wireless communication signal and at least one speaker for making said wireless communication signal audible.

16. The method according to claim 15, wherein said wireless communication signal is a two-way communication signal and said mobile unit contains a microphone.

17. The method according to claim 10, wherein said step of individually authorizing each base unit to identify said wireless signal transmitted by said mobile unit includes generating a unique code for said mobile unit and each of said base units, wherein the unique code for each of said base units is stored in said mobile unit and wherein said unique code for said mobile unit is stored within each said base unit.

18. The method according to claim 17, said step of individually authorizing each base unit to identify said wireless signal includes bringing said mobile unit into direct electrical contact with each of said base units.

19. A method of defining the operational area for a remote transceiver used to call for emergency services, said method comprising the steps of:
providing a portable transceiver capable of wirelessly transmitting an activation signal and audible signals;
providing a plurality of base units, wherein each base unit is capable of being activated by said activation signal when said portable transceiver transmits said activation signal within a predetermined range, and wherein each said base unit automatically dials an emergency number when activated; and
connecting said base units to a plurality of separate telephone lines, wherein each of said telephone lines has its own automatic location identification data, and wherein said predetermined range of said base units combine to define said operational area for said transceiver.

20. The method according to claim 19, further including the step of instructing each of said base units to identify said activation code produced by said transceiver.

* * * * *